March 30, 1954     W. E. SEGL     2,673,690
METHOD FOR THE DIGESTION OF CELLULOSE-BEARING MATERIAL
Filed Oct. 27, 1951     2 Sheets-Sheet 1

WALTER E. SEGL
INVENTOR.

BY    *Ernest G. Peterson*

AGENT.

March 30, 1954     W. E. SEGL     2,673,690
METHOD FOR THE DIGESTION OF CELLULOSE-BEARING MATERIAL
Filed Oct. 27, 1951     2 Sheets-Sheet 2

WALTER E. SEGL
INVENTOR.

BY Ernest G. Peterson

AGENT.

Patented Mar. 30, 1954

2,673,690

UNITED STATES PATENT OFFICE 2,673,690

METHOD FOR THE DIGESTION OF CELLULOSE-BEARING MATERIAL

Walter E. Segl, Wilmington, Del., assignor to Hercules Powder Company, Wilmington, Del., a corporation of Delaware Application October 27, 1951, Serial No. 253,521

9 Claims. (Cl. 241—3)

This invention relates to the purification of cellulose-bearing materials and more particularly to improvements in the art of digestion of such materials with chemicals at elevated temperatures and pressures.

This invention is a continuation-in-part of my copending application, Serial No. 104,616, filed July 14, 1949.

There are numerous factors to be considered in the processing of cellulose-bearing materials to render them satisfactory for ultimate predetermined use. Additionally, the ultimate predetermined use of the cellulose imposes requirements upon the method and apparatus utilized for treatment which requirements have heretofore not been satisfied. For example, if it is desired to manufacture a purified or semichemical pulp from wood, fibrous or other similar cellulose-bearing material or if it is desired to manufacture chemical cellulose from cotton linters or the like, the physical structure and form of the starting material will vary widely and the method and apparatus must be possessed of great versatility to accommodate variation in physical form, chemicals, temperatures and pressures. Moreover, the method and apparatus utilized for a substantially continuous digestion should be capable of handling the material to be treated with a minimum of pretreatment and a minimum of subsequent treatment to render the material uniform and satisfactory for end product use.

Therefore, an object of the present invention is to provide a method for the substantially continuous digestion of cellulose-bearing material and particularly cotton linters in which a material of uniform quality is obtained.

It is another object of the invention to provide a method for rapid purification of cellulose-bearing material by high-consistency digestion.

It is still another object of the invention to provide an improved method for minimizing pretreatment and subsequent treatment and affording rapid purification of the cellulose with uniform viscosity and quality characteristics.

It is a further object of this invention to provide a novel method and apparatus for forming and disintegrating pressure-resistant compacts of cellulose-bearing material.

Other objects of the invention will be apparent hereinafter with reference to the following description and the appended claims.

Generally described, the present invention comprises a method for the digestion of a cellulose-bearing material which comprises wetting the material with liquid, removing a portion of the liquid, forming a pressure-resistant compact of the material, digesting material from the compact in the presence of digestion medium and under superatmospheric pressure and temperature, and subjecting the digested material to reduced pressure at intermittent intervals.

In a particular aspect the present invention is primarily concerned with a method and apparatus for forming and disintegrating a pressure-resistant compact of cellulose-bearing material.

An example of the general operation of the invention is given. The cellulosic starting material is subjected to the usual preparation treatment. For example, wood, straw, and other bulk cellulose-containing materials are reduced to chips or shreds and screened. Preferably, the chips or like material to be treated will have at least one thickness in the order of ¼ inch and will pass a ¾-inch mesh screen. Raw linters and similar fibrous cellulosic material are simply subjected to the usual bale opening facilities. Ground wood pulp or chemical wood pulp may be used without additional preparation where in the former instance substantially complete digestion is desired and in the latter further digestion treatment for special end product use. The cellulosic starting material after suitable preparation, if necessary, is then weighed by a constant weight feed device and a pretreatment solution of water or water and chemicals is thoroughly mixed with the material in a pretreatment zone. The pretreatment solution may be water to serve as a lubricant for the wetted material, or it may be water and chemicals in which the latter may be acid or alkaline digestion medium, with or without wetting agent, detergent, or other digestion aid or bleaching medium, or like chemical agents. These chemicals may be employed as desired to effect certain desired conditioning prior to actual digestion. An excess of the pretreatment solution should be present to insure positive wetting of the material and adequate lubrication. The material from the pretreatment zone is continuously passed into a compaction zone wherein excess pretreatment solution is squeezed from the material as it is formed into a pressure-resistant compact. The material from the pressure-resistant compact is continuously fed into the digestion zone in the presence of digestion chemicals and under conditions of superatmospheric pressure and temperature. The quantity and type of chemicals used, the pressure and temperature, and length of the digestion period may be varied according to the yield and quality of the cellulose desired. The material is then continuously passed from the digestion zone into a second compaction zone wherein the excess digestion chemicals are squeezed from the material as it is formed into a compact. The material from the compact is then blown to substantially atmospheric pressure at intermittent intervals whereby the formerly compacted material is thoroughly disintegrated and is free of small lumps or "pills." The intervals at which the material is blown to substantially atmospheric pressure are regulated and are of short duration to afford a small and carefully controlled pressure drop in the digestion zone. The discharged material may then be washed, bleached, sheeted, or bulk dried, or otherwise suitably processed as desired for subsequent use.

A preferred embodiment of the invention has been chosen for purposes of illustration and description and is shown in the accompanying diagrammatic drawings forming a part of the specification wherein reference symbols refer to like parts wherever they occur.

In the presentation of the preferred embodiment of the invention, raw cotton linters are used as an example of the material being processed and pressure is given in pounds per square inch gage, temperature in degrees F., and parts and percentages by weight.

Figure 1:
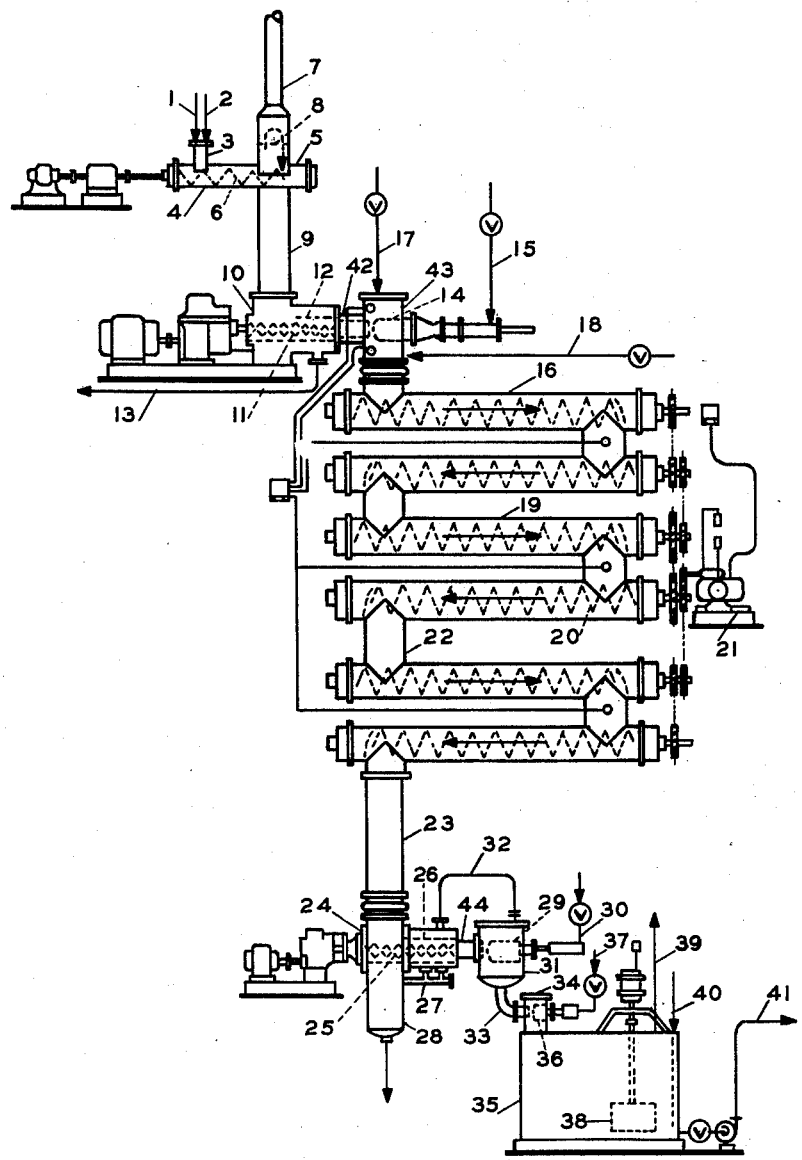
Fig. 1 is a diagrammatic flow sheet depicting a method and suitable apparatus for effecting the digestion of cellulose-bearing material.

Referring now to Fig. 1 of the accompanying drawings, 1 part of linters and 6 parts of solution were continuously charged through lines 1 and 2, respectively, into a conduit 3. The linters contained about 6% moisture and the solution was a normal aqueous digestion solution, containing 2.5% caustic alkali and detergent, heated to 180°. From the conduit 3, the material was continuously charged into a pretreatment zone 4 in which it was thoroughly mixed and wetted. The pretreatment zone 4 was composed of a wetting trough 5 having a motor-driven screw conveyor 6 disposed therein. The conduit 3 was located near one end of the wetting trough 5 and a blow-out vent 7 discharging to atmosphere was provided near the other end. A baffle 8 was provided in the blow-out vent 7 to establish a static head of the solution as between the conduit 3 and the baffle 8 through which the material was progressed. The blow-out vent additionally serves as a release to atmosphere if accidental back pressure occurs. From the pretreatment zone 4, the material was continuously charged through conduit 9 into a first compaction zone 10 in which more than 80% of the solution was removed and the material was formed into a pressure-resistant compact. The compaction zone 10 contained a motor-driven screw 11 disposed in a foraminous jacket 12 through which the excess solution passed as the material was compacted by the screw. The excess solution was removed from the compaction zone 10 through line 13 as the material was continuously formed into the pressure-resistant compact by being forced through conduit 42 and then against a pressure-actuated ram 14 in compact disintegrating zone 43. The ram 14 was provided with a valved air line 15 for controlling the amount of force delivered by the ram against the pressure-resistant compact. The ram additionally serves as a check valve for the compaction zone in the event the pressure-resistant compact should fail to withstand the fluid pressure within the system. The material was continuously extruded against the head of ram 14 where it was disintegrated by the continuous and directly opposed compressive force and dropped therefrom into a digestion zone 16. A valved line 17 continuously fed digestion liquor over the material being extruded and a valved line 18 continuously fed steam under the material. The digestion liquor was the same as the solution used in the pretreatment zone except that it was heated to about 340° and continuously charged in a ratio of 2 parts of liquor to 1 part of linters. If desired, as little as 1 part of liquor to each part of linters can be used. The valved line 18 was adjusted to a steam pressure of 100 pounds. The digestion zone 16 was composed of a plurality of digesters represented by 19 in superposed relationship. Each digester was provided with a driven screw conveyor represented by 20 which agitated and progressed the material substantially throughout the length of the digester. The first digester progressed the material in one direction and its subjacent digester in the opposite direction and so forth throughout the digestion zone 16. The conveyors were interconnected and uniformly driven by a motor 21 and the digesters were connected to each other by conduits represented by 22. A pressure and temperature recorder was provided for determining the pressure and temperature within the digester at various points. The material was in the digestion zone 16 for approximately 12 minutes at an average temperature of about 338°. The material from the digestion zone 16 was then passed through a conduit 23 into a second compaction zone 24 in which a major portion of the spent digestion liquor was removed as the material was formed into a compact. The compaction zone 24 contained a motor-driven screw 25 disposed in a foraminous jacket 26 through which the excess liquor passed as the material was compacted by the screw. The excess liquor was removed from the compaction zone 24 through conduit 27 into black liquor tank 28 as the material was continuously formed into the compact by being forced against a pressure-actuated ram 29. The ram 29 was provided with a valved air line 30 for controlling the amount of force delivered by the ram against the compact and for controlling the amount of black liquor removed during compaction. The material was continuously extruded through conduit 44 and against the head of ram 29 where it was disintegrated by the continuous and directly opposed compressive force and dropped therefrom to the bottom of a pressure-equalizing zone 31. The zone 31 was maintained at approximately the same pressure as that in the digestion zone 16 by line 32. The material from zone 31 passed through a conduit 33 into a blow tank 34 which in turn discharged the material into a receiving tank 35. A blow valve 36 within the blow tank 34 was intermittently actuated at ten-second intervals by an air line 37 whereby the material was blown into the receiving tank 35 at substantially atmospheric pressure. The time interval during which the blow valve 36 was open was regulated so that the pressure drop did not exceed 5 pounds. The formerly compacted material was found to be thoroughly disintegrated at this stage of the process. An agitator 38 was provided in the receiving tank 35 and the slurry therein continuously agitated. The steam and vapor accumulating within the receiving tank 35 were vented to the atmosphere through line 39 and the slurry was continuously withdrawn. Waste water from a washer (not shown) was continuously admitted by line 40 to the receiving tank 35 and the slurry was maintained at a ratio of about 49 parts of waste water to about 1 part material. From the bottom of the tank 35, the slurry was pumped through line 41 to suitable equipment (not shown) wherein it was washed and subsequently bleached using conventional procedure. The resulting product possessed good quality and excellent uniformity.

Figure 2:
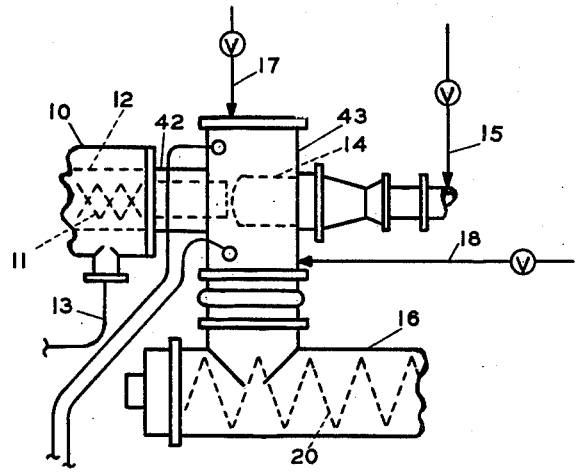
Fig. 2 is an enlarged sectional view of a portion of the flow diagram in Fig. 1 depicting the method for forming and disintegrating compacts of cellulose-bearing material wherein the face of the ram is curved convexly.

Fig. 2 is an enlarged view of compact disintegrating zone 43 and associated apparatus necessary for the disintegration of the pressure-resistant compact of cellulosic material. Figs. 3, 4, 5, and 6 depict various stages in the formation and disintegration of the pressure-resistant compact, and these latter figures will be discussed in conjunction with a discussion of Fig. 2.

Figures 3, 4:
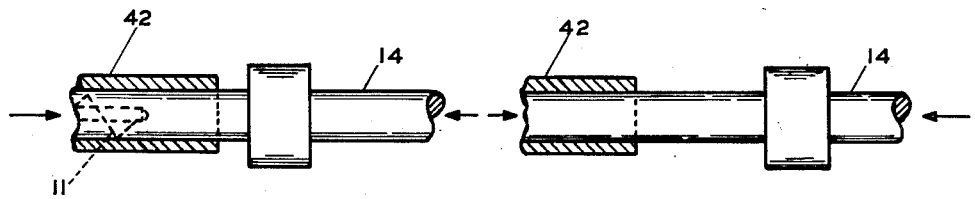
Fig. 3 is an enlarged view depicting an initial stage in the formation of the pressure-resistant compact of cellulose-bearing material wherein as an alternative embodiment the face of the ram is flat.
Fig. 4 is an enlarged view depicting the formation of the pressure-resistant compact initially illustrated in Fig. 3.
Figures 5, 6:
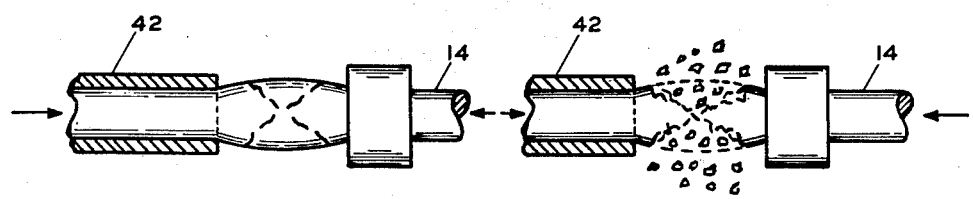
Fig. 5 is an enlarged view depicting an initial stage in the disintegration of the pressure-resistant compact initially illustrated in Fig. 3.
Fig. 6 is an enlarged view depicting the disintegration of the pressure-resistant compact initially illustrated in Fig. 3.

The cellulosic material wetted with pretreatment liquid is extruded through compacting zone 10 by screw 11, and the compact then passes via conduit 42 into zone 43. In zone 43 the compact contacts pressure-actuated ram 14, and in the initial stage of the contacting the compact and ram are in a position similar to that shown in Fig. 3. The pressure exerted upon ram 14 by the air in line 15 causes ram 14 to exert a force against the compact, but in the initial stage, as shown in Fig. 3, the internal cohesive force of the compact is greater than the forces exerted upon it by screw 11 and ram 14. Consequently, the movement of screw 11 and the continued formation and increase in length of compact causes a backward movement of ram 14 into a position such as that shown in Fig. 4. In Fig. 4 the internal cohesive force of the compact is about equal to or slightly greater than the forces exerted on it by screw 11 and ram 14. However, as the movement of screw 11 continues, the length of the compact increases, and the compact begins to bulge convexly and to cripple and fracture as shown in Fig. 5. The compact then disintegrates or is comminuted into many small fragments of cellulosic material and upon disintegration of the compact, ram 14 moves forward quickly into contact with an unbroken or unfractured portion of the compact, as shown in Fig. 1. Further formation and successive disintegration of the compact is then effected in the manner described.

If the compact of cellulosic material formed by screw 11 should fail either inside or outside zone 43, ram 14 acts as a check valve against the pressure within digestion zone 16. Upon failure of the compact, ram 14 quickly moves forward to seal the opening through which the compact enters zone 43 after passage through conduit 42. During satisfactory operation and formation of the compact, the compact itself acts to maintain the pressure within digestion zone 16, and, upon failure of the compact, ram 14 seals the opening in the manner described above.

The above description of the procedure and apparatus for forming and disintegrating a pressure-resistant compact has been directed primarily to zone 43, but a similar procedure and apparatus are employed in zone 31.

The facing or extremity of rams 14 and 29 adjacent the compact of cellulosic material can be flat, as in Figs. 3, 4, 5 and 6, or it can be curved convexly, as shown in Figs. 1 and 2. In some instances the convex curvature is preferred in order to obtain a more effective seal in the event of failure of the compact of cellulosic material.

The pressure that is exerted on the ram through the suitably disposed pressure line can be either constant or varying. When a varying pressure is used, the pressure ordinarily is increased as the ram is forced backwardly by the extruding screw and compact.

It is evident that there are numerous factors which will influence conditions for the most satisfactory operation of the invention, the actual limits of which cannot be determined except by a detailed study of each set of raw materials and the finished product involved. For example, in another embodiment of the invention, the material from the digestion zone may be charged directly into the pressure-equalizing zone. In instances where the consistency is maintained at a high level and there is little or substantially no excess liquor present, the material may be passed directly into the pressure-equalizing zone. The raw material may be a cellulosic material such as wood chip, wood waste, wheat straw and other agricultural residues, linters, and pulps requiring further refinement. The raw material may be difibrated prior to digestion or subsequent to digestion as desired. The pretreatment liquid may be chemically inert such as water, or may be a chemically active aqueous solution containing chlorine, sodium sulfide and hydroxide, sulfurous acid and a bisulfite, sodium hydroxide, and the like. It will be seen, therefore, that the pretreatment liquid may be water per se, or bleach solution such as aqueous hypochlorite, or digestion solution such as aqueous sodium hydroxide. The digestion liquid may be an aqueous solution of any of the chemically active agents hereinbefore referred to for pretreatment depending on the raw material involved. Generally, the quantity and type of chemicals used, the pressure and temperature, and length of the digestion period may be varied according to the yield and quality of the cellulose desired. In accordance with the preferred embodiment of this invention, wherein the raw material is cotton linters, the pretreatment liquid may range from a weak to a strong aqueous solution of caustic alkali, that is, from about 0.5 to about 7% and higher, say, up to 15%, depending on the quality of the starting material and quality of the cellulose desired. The digestion liquor may be an aqueous solution comprising from about 0.5 to about 10% caustic alkali with digestion carried out under a steam pressure from about 25 to about 175 pounds gage per square inch at a temperature from about 266° to about 377° F. During digestion, the ratio of digestion liquor to linters may be maintained from about 1:1 to about 5:1 with satisfactory operation, and from the standpoint of economy the lowest possible liquor to linters ratio, say, approaching a 1:1 ratio, is used. Detergents, wetting agents, and other digestion aids may be added to the digestion liquor or added to the digester to aid in the removal of undesirable material during digestion. Similarly, in the sulfite, soda, and sulfate processes which constitute the major proportion of chemical pulps, conventional digestion chemicals and moderants may be utilized in conjunction with this invention with distinct benefit. This is more readily seen in reference to the advantages of the invention. For example, the pretreatment step affords thorough wetting and necessary lubrication for charging the material and may include some chemical action if desired. It has been pointed out above that a low liquor to linters ratio is desirable for economic reasons, and it is possible to use far lower ratios in this continuous process than in batch digestion procedures. The main reason for this improvement is the thorough and uniform distribution of a small amount of liquor through the mass of linters that is accomplished by the action of the charging screw in squeezing out excess liquor. Additionally, excess solution is removed which from the standpoint of chemical recovery is important throughout the entire process. The heat distribution and contact of the material with chemical throughout the digestion step is exceptionally uniform and thorough so that low liquor to linters ratios increased chemical concentration and reduced time of digestion may be employed. Additionally, chemical concentration may be varied throughout the digestion zone by providing intermediate points along the digesters for charging dilution or concentration medium to the zone as desired. Excess solution, if present, is removed from the digested material so that the chemicals can be recovered or reused before being diluted with copious amounts of water which entail additional expense in recovery of chemical or concentration for reuse. The digested material in this relatively "dry" and pressurized state is blown to substantially atmospheric pressure at intermittent intervals. This sudden expulsion distends the material and renders it ideal for subsequent treatment including washing, bleaching, defibration, or similar desired after-treatment procedures.

It will be seen, therefore, that the advantages of this invention are multifold and that the invention may be carried out by the use of various modifications and changes without departing from its spirit and scope.

What I claim and desire to protect by Letters Patent is:

1. The method for forming and disintegrating a pressure-resistant compact of cellulosic material which comprises continuously forming a pressure-resistant compact of cellulosic material containing liquid in a conduit by extruding said material against a pressure-actuated ram, and successively disintegrating the compact so formed by continuously extruding said compact from the conduit as an integral body of sufficient strength to force the ram backward with continued lengthening of said body to a point at which a substantial portion of the entire length of said body of material is instantly disintegrated into fragments by the compressive force exerted thereon between the conduit and the ram after which said ram moves forward to engage a new portion of the compact being continuously extruded from the conduit and the operation repeats to give successive disintegration of the continuously formed pressure-resistant compact.

2. The method for forming and disintegrating a pressure-resistant compact of cellulosic material which comprises continuously forming a pressure-resistant compact of wet cellulosic material and removing liquid therefrom in a conduit by extruding said material against a pressure-actuated ram, and successively disintegrating the compact so formed by continuously extruding said compact from the conduit as an integral body of sufficient strength to force the ram backward with continued lengthening of said body to a point at which a substantial portion of the entire length of said body of material is instantly disintegrated into fragments by the compressive force exerted thereon between the conduit and the ram after which said ram moves forward to engage a new portion of the compact being continuously extruded from the conduit and the operation repeats to give successive disintegration of the continuously formed pressure-resistant compact.

3. The method for forming and disintegrating a pressure-resistant compact of cellulosic material which comprises continuously forming a pressure-resistant compact of wet cellulosic material and removing liquid therefrom in a conduit by extruding said material against a pressure-actuated ram, successively disintegrating the compact so formed by continuously extruding said compact from the conduit as an integral body of sufficient strength to force the ram backward with continued lengthening of said body to a point at which a substantial portion of the entire length of said body of material is instantly disintegrated into fragments by the compressive force exerted thereon between the conduit and the ram after which said ram moves forward to engage a new portion of the compact being continuously extruded from the conduit and the operation repeats to give successive disintegration of the continuously formed pressure-resistant compact, and discharging the material thus disintegrated into a zone maintained at a pressure other than atmospheric, said zone being in communication with the exit end of the conduit.

4. The method for forming and disintegrating a pressure-resistant compact of cellulosic material which comprises continuously forming a pressure-resistant compact of wet cellulosic material and removing liquid therefrom in a conduit by extruding said material against a pressure-actuated ram, successively disintegrating the compact so formed by continuously extruding said compact from the conduit as an integral body of sufficient strength to force the ram backward with continued lengthening of said body to a point at which a substantial portion of the entire length of said body of material is instantly disintegrated into fragments by the compressive force exerted thereon between the conduit and the ram after which said ram moves forward to engage a new portion of the compact being continuously extruded from the conduit and the operation repeats to give successive disintegration of the continuously formed pressure-resistant compact, and discharging the material thus disintegrated into a zone maintained at a pressure other than atmospheric, said zone being in communication with the exit end of the conduit and the ram being sealable to said exit end of the conduit in the event of failure of the compact within the conduit.

5. The method in accordance with claim 1 in which the cellulosic material is cotton linters.

6. The method in accordance with claim 1 in which the cellulosic material is wood chip.

7. The method in accordance with claim 1 in which the cellulosic material is wood waste.

8. The method in accordance with claim 1 in which the cellulosic material is wheat straw.

9. The method in accordance with claim 1 in which the cellulosic material is pulp requiring further refinement.

WALTER E. SEGL.

References Cited in the file of this patent

UNITED STATES PATENTS

| Number | Name | Date |
|---|---|---|
| 1,048,853 | Muntzing | Dec. 31, 1912 |
| 2,059,435 | Brownlee | Nov. 3, 1936 |
| 2,321,015 | Davis | June 8, 1943 |
| 2,374,363 | McCaskell | Apr. 24, 1945 |
| 2,428,995 | Rogers | Oct. 14, 1947 |
| 2,542,801 | De la Roza | Feb. 20, 1951 |